(12) United States Patent
Wolfe et al.

(10) Patent No.: US 7,418,922 B2
(45) Date of Patent: **\*Sep. 2, 2008**

(54) METHODS FOR INJECTING AND SAMPLING MATERIAL THROUGH AVIAN EGG MEMBRANES

(75) Inventors: Stephen P. Wolfe, Chapel Hill, NC (US); Phillip L. Rybarczyk, Jr., Chapel Hill, NC (US); Sean Bryan, Raleigh, NC (US); Mike Schnupper, Raleigh, NC (US); Dan Rees, Zebulon, NC (US); Jamie Sprenkel, Raleigh, NC (US); Edward W. Gross, Raleigh, NC (US); Brantley Angell, Garner, NC (US); John H. Hebrank, Durham, NC (US)

(73) Assignee: Embrex, Inc., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/702,454

(22) Filed: Feb. 5, 2007

(65) Prior Publication Data

US 2007/0137577 A1    Jun. 21, 2007

Related U.S. Application Data

(62) Division of application No. 11/243,777, filed on Oct. 5, 2005.

(51) Int. Cl.
*A01K 45/00* (2006.01)

(52) U.S. Cl. .................................. 119/6.8

(58) Field of Classification Search .......... 119/6.8
See application file for complete search history.

(56) References Cited

U.S. PATENT DOCUMENTS

| 4,040,388 | A | 8/1977 | Miller |
| 4,458,630 | A | 7/1984 | Sharma et al. |
| 4,469,047 | A | 9/1984 | Miller |
| 4,593,646 | A | 6/1986 | Miller |
| 4,681,063 | A | 7/1987 | Hebrank |
| 4,903,635 | A | 2/1990 | Hebrank |
| 5,028,421 | A | 7/1991 | Fredericksen et al. |
| 5,136,979 | A | 8/1992 | Paul et al. |
| RE35,973 | E | 12/1998 | Paul et al. |
| 6,032,612 | A | 3/2000 | Williams |
| 6,244,214 | B1 | 6/2001 | Hebrank |

*Primary Examiner*—Son T. Nguyen
(74) *Attorney, Agent, or Firm*—Myers Bigel Sibley & Sajovec, P.A.

(57) ABSTRACT

An injection apparatus for injecting and/or removing substances from subjects, such as avian eggs, includes an injection needle having a body portion and a tapered portion that terminates at a tip. A tube is attached to and extends around the injection needle in substantially concentric relationship therewith. The tube has an end portion positioned a predetermined distance from the needle tip. The tube end portion acts as a stop to limit the distance the needle tip can be inserted into a subject, such as an egg, through a membrane of the subject. A detector may be utilized to measure force exerted on a membrane of an egg by a stop attached to a needle. Force exerted on a membrane by a needle and/or by a needle and a stop attached to the needle may also be measured.

20 Claims, 10 Drawing Sheets

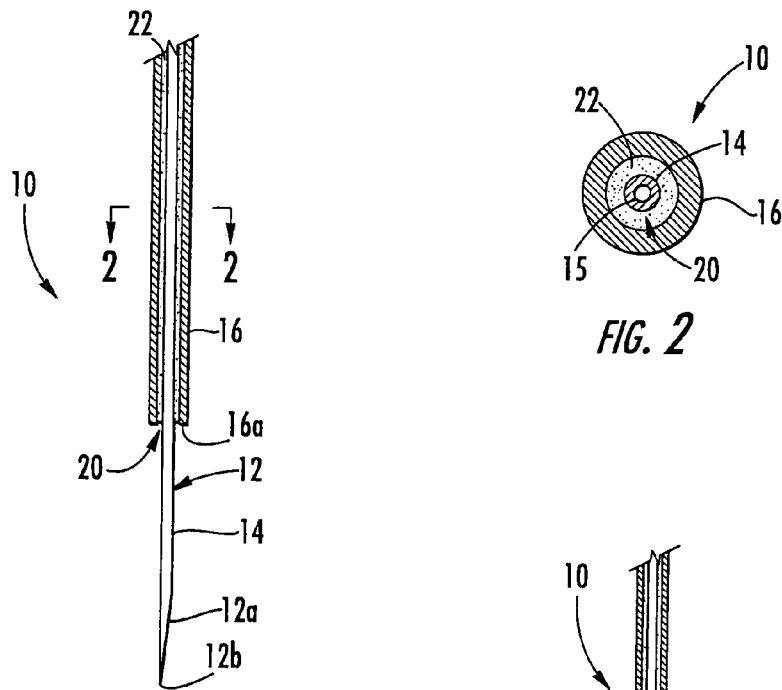
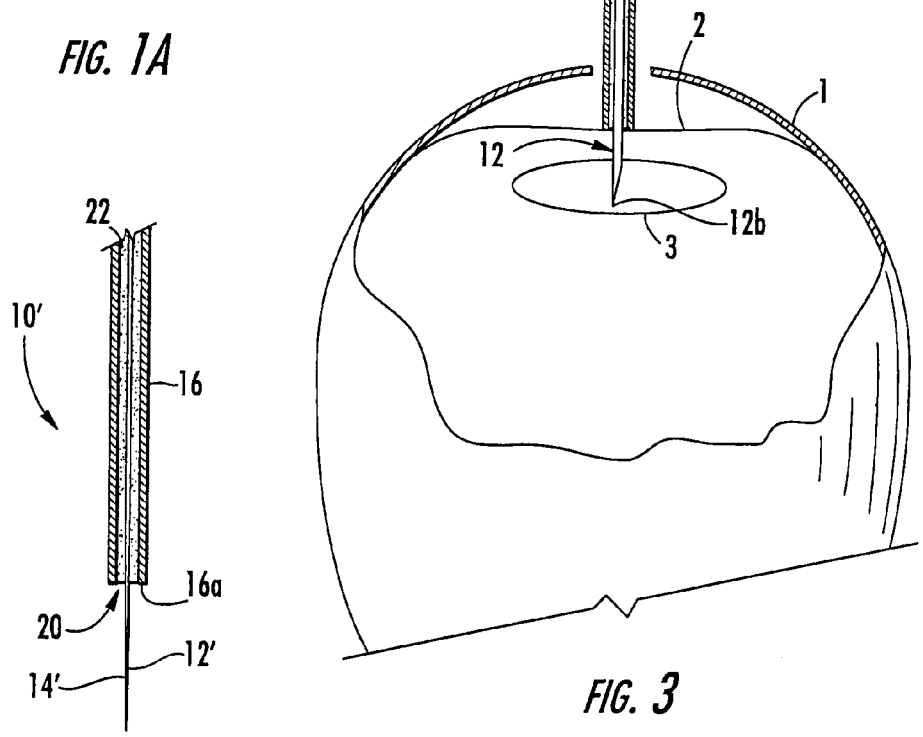

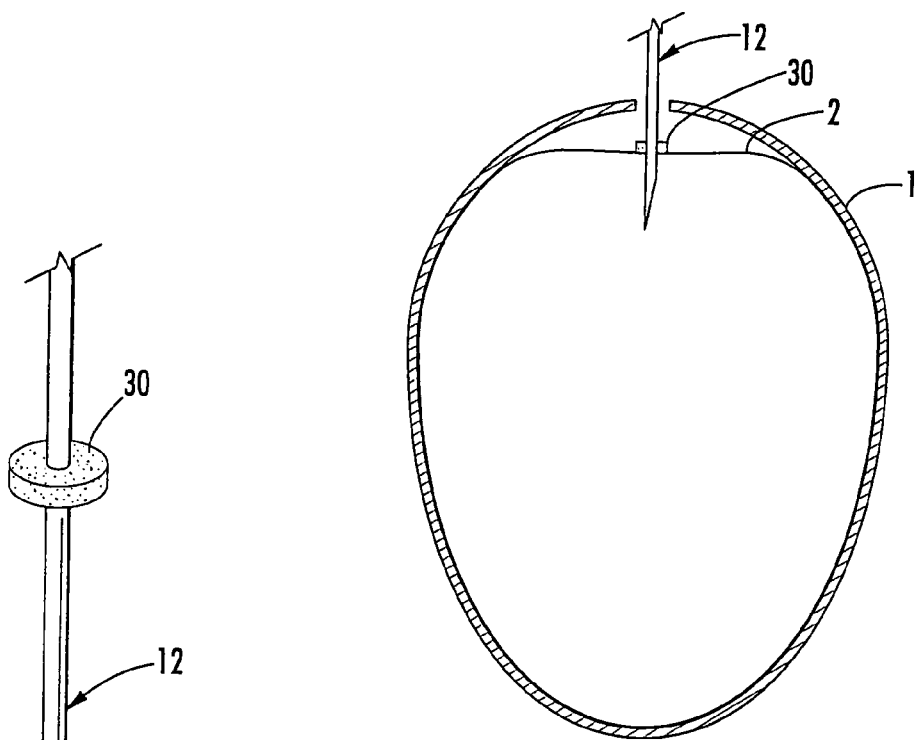
FIG. 4A
FIG. 4B
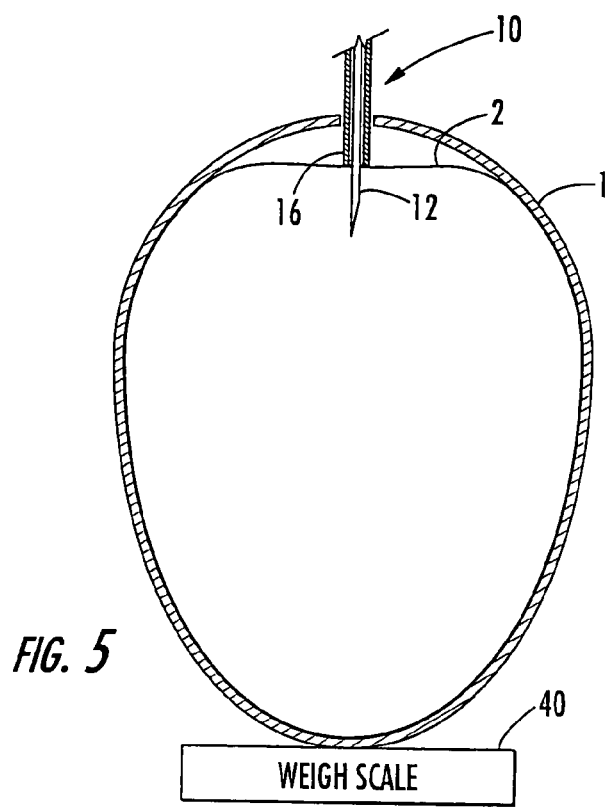
FIG. 5

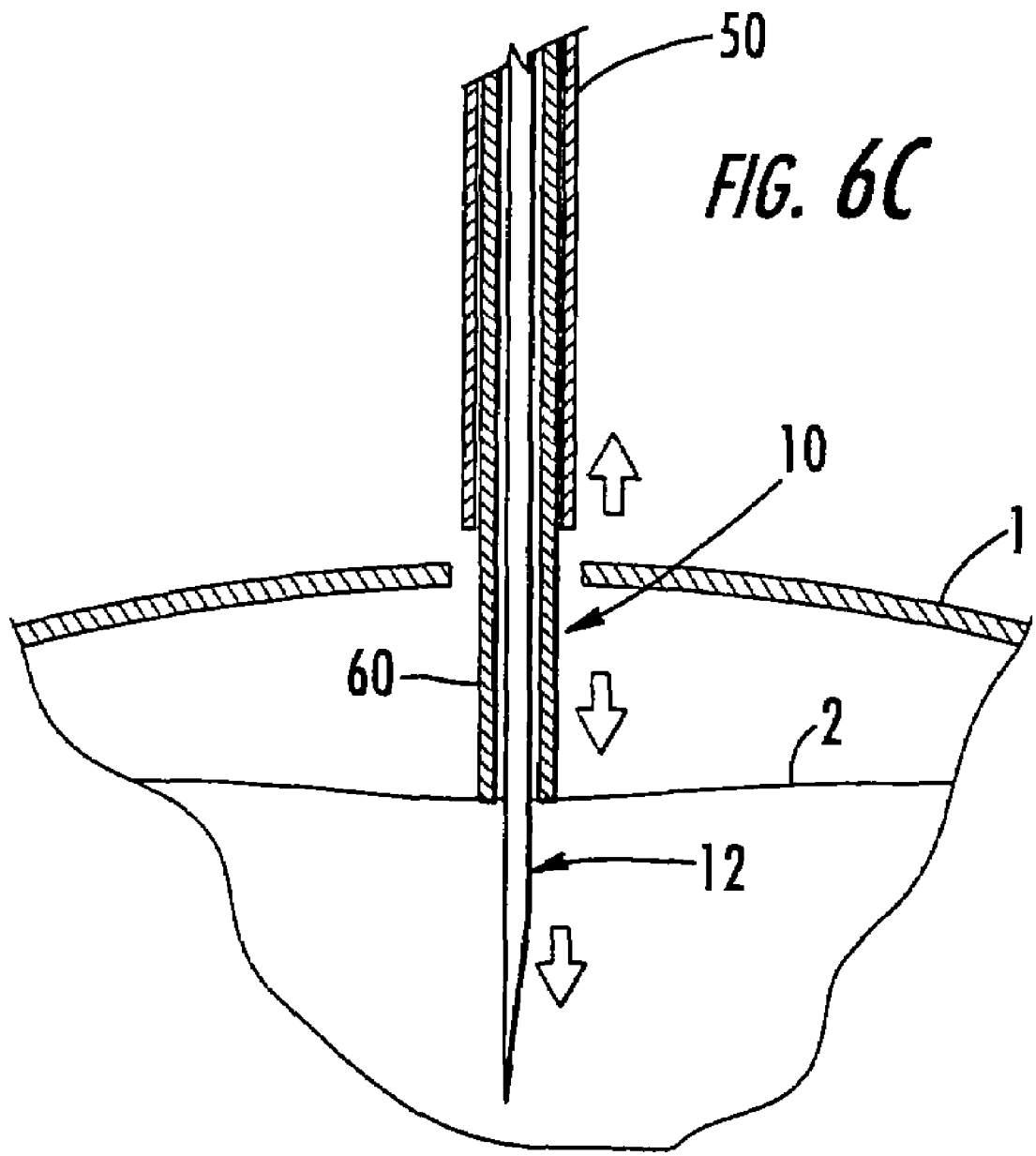

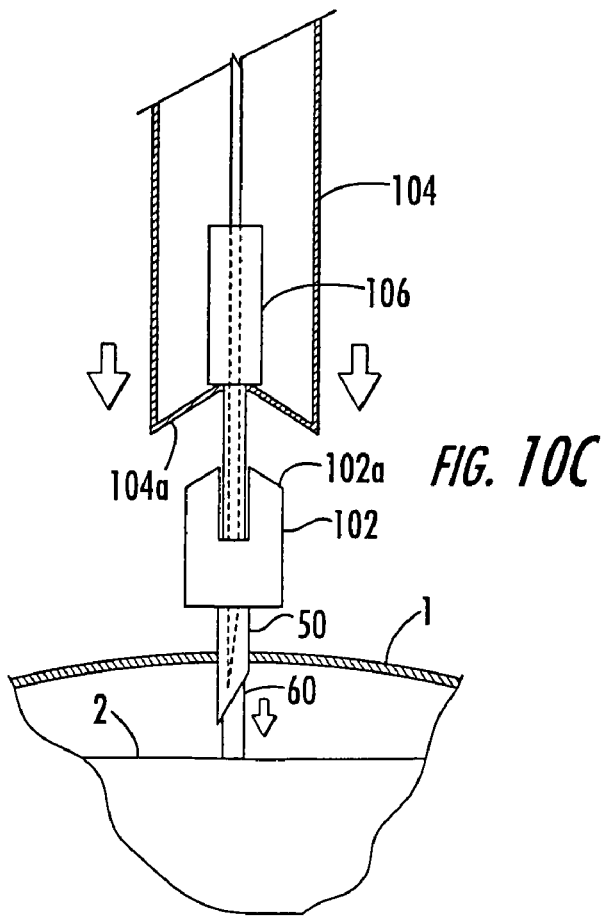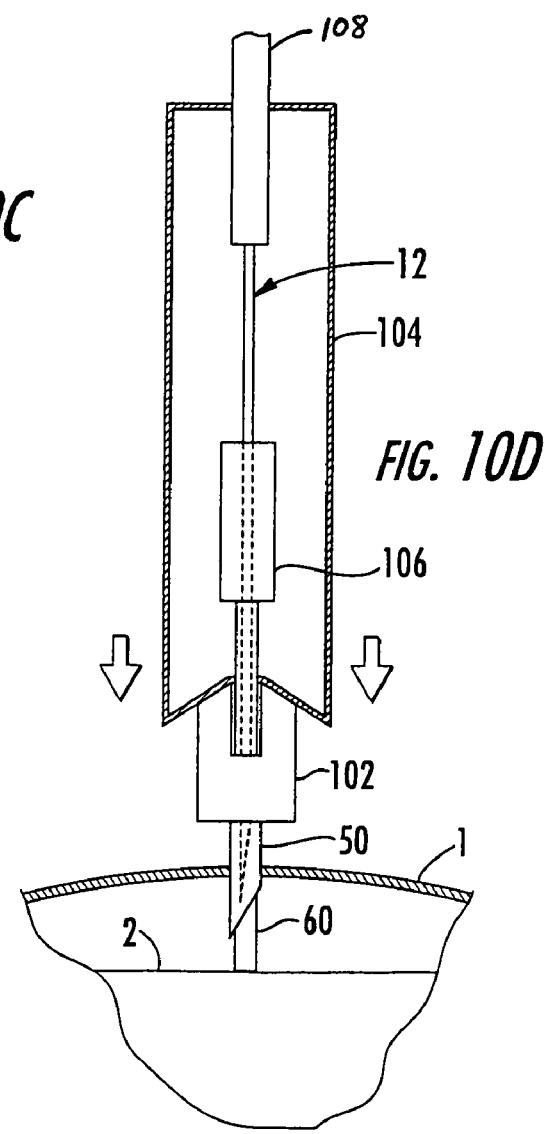

METHODS FOR INJECTING AND SAMPLING MATERIAL THROUGH AVIAN EGG MEMBRANES

RELATED APPLICATION

This application is a divisional application of pending U.S. patent application Ser. No. 11/243,777 filed Oct. 5, 2005, which is incorporated herein by reference in its entirety.

FIELD OF THE INVENTION

The present invention relates generally to eggs and, more particularly, to devices for injecting and/or removing material from eggs.

BACKGROUND OF THE INVENTION

In poultry hatcheries and other egg processing facilities, eggs are handled and processed in large numbers. The term "processing" includes treating live eggs with medications, nutrients, hormones and/or other beneficial substances while the embryos are still in the egg (i.e., in ovo). In ovo injections of various substances into avian eggs have been employed to decrease post-hatch morbidity and mortality rates, increase the potential growth rates or eventual size of the resulting bird, and even to influence the gender determination of the embryo. Injection of vaccines into live eggs have been effectively employed to immunize birds in ovo. It is further desirable in the poultry industry to manipulate an embryo in ovo to introduce foreign nucleic acid molecules (i.e., to create a transgenic bird) or to introduce foreign cells (i.e., to create a chimeric bird) into the developing embryo.

In ovo injection of a virus may be utilized to propagate the particular virus for use in preparation of vaccines. For some applications it may be desirable to insert a sensing device inside an egg containing an embryo to collect information therefrom, for example, as described in U.S. Pat. No. 6,244,214 to Hebrank. In addition, it may be desirable to remove material samples from eggs, including embryonic and extra-embryonic materials.

Examples of in ovo treatment substances and methods of in ovo injection, as well as apparatus for handling a plurality of eggs, are described in U.S. Pat. No. 4,458,630 to Sharma et al. and U.S. Pat. No. 5,028,421 to Fredericksen et al.

Many of the above-described in ovo methods require accurate positioning of a needle, sampling device or sensing device within an egg. However, it can be difficult to accurately and repetitively position a needle, sampling device, or sensing device within various compartments of an egg using conventional in ovo apparatus and methods. Accordingly, there is a need in the art for improved methods of accurately and repetitively placing devices including, but not limited to, needles, sensing devices and sampling devices within various compartments and locations of eggs.

SUMMARY OF THE INVENTION

In view of the above discussion, an injection apparatus for injecting and/or removing substances from subjects, such as avian eggs, is provided and includes an injection needle having a body portion and a tapered portion that terminates at a tip. A tube is attached to and extends around the injection needle in substantially concentric relationship therewith. The tube has an end portion positioned a predetermined distance from the needle tip. The tube end portion acts as a stop to limit the distance the needle tip can be inserted into a subject, such as an egg, through a membrane of the subject. An annular space is defined between the injection needle and the tube. Material, such as a sealant material is disposed within the annular space to prevent the flow of material through the annular space. Alternatively, the injection needle and tube may be fused together, thereby eliminating an annular space.

According to other embodiments of the present invention, a disk of material (or other shapes of material) may surround an injection needle at a predetermined distance from the injection needle tip and serve the function of a stop when contact is made with a membrane or other tissue of a subject. The disk of material may be formed from various materials and may have virtually any shape and configuration. An exemplary disk of material may be a bead of adhesive material applied circumferentially to the injection needle.

According to other embodiments of the present invention, a detector (e.g., a weigh scale, load cell, etc.) may be utilized to measure the force exerted on a membrane of an egg by a stop attached to a needle. Force exerted on a membrane by a needle and/or by a needle and a stop attached to the needle may also be measured.

According to other embodiments of the present invention, an apparatus includes a tubular punch configured to form an opening in the shell of an egg. A needle (e.g., an injection needle, sampling needle, etc.) is positioned within the punch for movement therethrough and through an opening in an egg shell formed by the punch. A stop is attached to the needle and is configured to contact the punch when the needle moves through the punch into an egg so as to limit the distance the needle is inserted within the egg.

According to other embodiments of the present invention, an apparatus includes a tubular punch configured to form an opening in the shell of an egg. A tubular locating member is reciprocally disposed within the punch and a needle (e.g., an injection needle, sampling needle, etc.) is reciprocally disposed within the tubular locating member. The locating member is configured to be lowered into an egg through the opening and contact a membrane (or other internal egg material) of an egg. Once contact is made, the locating member stops its downward motion and is locked into place so that it cannot move. The needle is then extended into the egg by a predetermined amount relative to the locating member and a substance is injected into the egg and/or a sample of material is taken from the egg.

According to embodiments of the present invention, a force exerted by the locating member on the membrane can be detected.

According to other embodiments of the present invention, a needle may be configured to act as a locating member. The needle has a blunt end that is not sharp enough to rupture a membrane during the step of locating the membrane. Once contact with the membrane has been made, the needle can the be pushed through the membrane with sufficient force and by a predetermined distance to inject a substance into the egg and/or remove a sample of material from the egg.

According to other embodiments of the present invention, an apparatus for sampling and/or injecting material from/into an avian egg includes a tubular punch that is configured to form an opening in the shell of an egg, a tubular locating member reciprocally disposed within the punch, and a needle reciprocally disposed within the locating member. A locking device is secured to the punch and is configured to lock the locating member in place relative to a membrane of an egg. The locking device is a compressible flange that has a tapered end portion configured to matingly engage with the end portion of the apparatus housing. When the flange and housing are matingly engaged, the flange compresses around the locating member and prevents movement of the locating member relative to the punch. The needle extends a predetermined distance past the locating member into an egg.

A method of injecting and/or sampling avian eggs, according to embodiments of the present invention, includes orienting an egg in a predetermined position; introducing an opening into the shell of the egg; extending a device through the opening in the egg shell; piercing a membrane within the egg via a needle tip and extending the needle into the egg until a stop attached to the needle contacts the membrane. Material may be deposited and/or removed from the egg via the needle. In addition, information may be obtained from the interior of the egg via a detector associated with the device extended into the egg. The device is then retracted from the egg.

A method of sampling material, such as allantoic fluid, from an egg, according to embodiments of the present invention, includes orienting an egg with the air cell up and forming an opening in the shell thereof. A locating device is extended through the opening until contact with a membrane (e.g., the chorio-allantoic membrane (CAM)) is detected. A sampling device is extended from the locating device through the CAM by a predetermined amount and a sample of allantoic fluid is obtained via the sampling device.

Embodiments of the present invention can be used to position a device at any location within an egg (e.g., the subgerminal cavity). The device may be utilized to deliver a substance and/or acquire a substance, and at any stage of embryo development.

BRIEF DESCRIPTION OF THE DRAWINGS

FIGS. 1A-1B are side section views of injection apparatus, according to embodiments of the present invention.

FIG. 2 is a cross-sectional view of the injection apparatus of FIG. 1A taken along line 2-2.

FIG. 3 is a cross-sectional view of an egg with the injection apparatus of FIG. 1A inserted therewithin and with the stop in contacting relationship with a membrane.

FIG. 4A is a perspective view of an injection needle having a stop attached thereto, according to another embodiment of the present invention.

FIG. 4B is a cross-sectional view of an egg with the injection apparatus of FIG. 4A inserted therewithin and with the stop in contacting relationship with a membrane.

FIG. 5 is a cross-sectional view of an egg with the injection apparatus of FIG. 1A inserted therewithin and with the egg in contacting relationship with a force detector, according to other embodiments of the present invention.

FIGS. 6A-6C are side, cross-sectional views of an apparatus having a locating member reciprocally disposed within a punch and a needle reciprocally disposed within the locating member, according to embodiments of the present invention.

FIGS. 10A-10F are side, cross-sectional views of an apparatus having a locating member reciprocally disposed within a punch and a needle reciprocally disposed within the locating member, according to other embodiments of the present invention.

DETAILED DESCRIPTION OF THE INVENTION

Figure 6A:
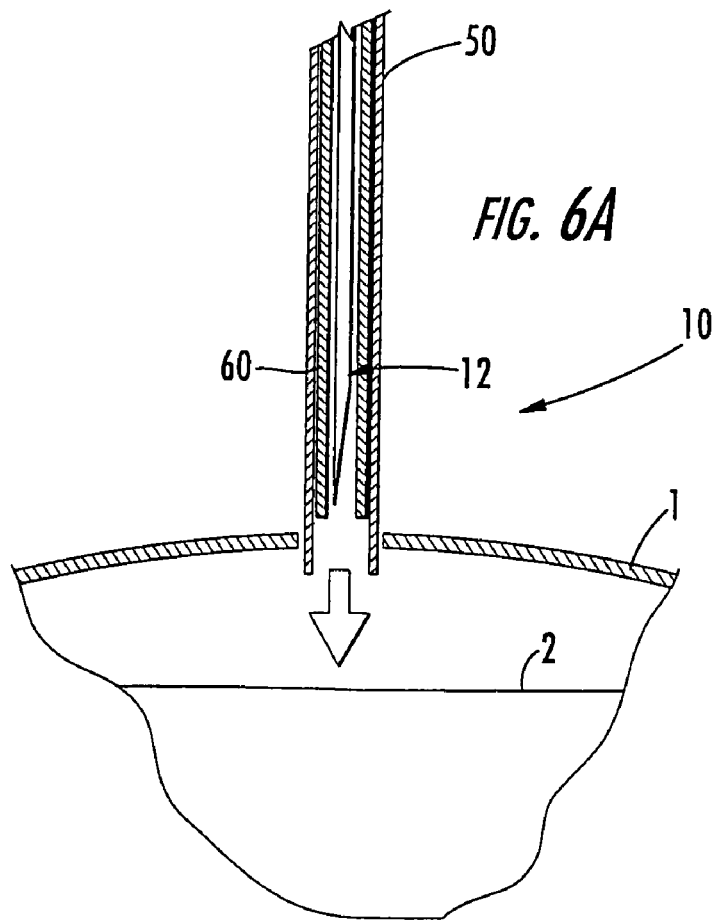

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. All publications, patent applications, patents, and other references mentioned herein are incorporated herein by reference in their entireties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

The terms "avian" and "avian subjects," as used herein, are intended to include males and females of any avian species, but are primarily intended to encompass poultry which are commercially raised for eggs, meat or as pets. Accordingly, the terms "avian" and "avian subject" are particularly intended to encompass various birds including, but not limited to, chickens, turkeys, ducks, geese, quail, pheasant, parakeets, parrots, cockatoo, cockatiel, ostrich, emu, etc.

As used herein, the term "early embryo" refers to an avian embryo from the time of lay (blastodermal stage) through about the developmental stage where primordial germ cells (PGCs) are migrating. With particular respect to chicken embryos, an "early embryo" is generally about an embryonic stage 20 (H&H) embryo or earlier. The developmental stages of the chicken embryo are well-understood in the art, see e.g., The Atlas of Chick Development, R. Bellairs & M. Osmond, eds., Academic Press, 1998, and need not be discussed further herein.

As used herein, the term "blastoderm" has its understood meaning in the art. Generally, a blastoderm includes an embryo from the time of lay through the end of gastrulation. The blastoderm is sometimes referred to by the alternative designations "germinal disc" or "embryonic disc" in the art. A blastoderm may be described as a flattened disc of cells that forms during cleavage in the early embryo and persists until the end of gastrulation. By the time of laying, two major regions of the blastoderm are visible, the centrally-situated area pellucida and the peripherally-located area opaca (The Atlas of Chick Development, R. Bellairs & M. Osmond, eds., Academic Press, 1998). With particular respect to chicken embryos, the blastoderm is typically characterized as an embryo from the time of lay (i.e., Stage IX or Stage X EG&K) through about stage XIII (EG&K) or higher.

As used herein, the terms "injection" and "injecting" encompass methods of inserting a device into an egg or embryo, including methods of delivering or discharging a substance into an egg or embryo, methods of removing a substance (i.e., a sample) from an egg or embryo, and/or methods of inserting a detector device into an egg or embryo.

The terms "chimeric bird" or "chimeric embryo" refer to a recipient bird or embryo, respectively, that contains cells (i.e., somatic cells and/or gametes) from another bird or embryo, referred to as a "donor."

The terms "transgenic bird" and "transgenic embryo" are used herein in accordance with their generally understood meanings in the art. A transgenic bird or transgenic embryo contains a foreign nucleic acid sequence in one or more cells.

As used herein, the term "membrane" refers to any layer of tissue within an egg that engages a stop attached to a needle, or other in ovo device, so as to prevent the needle from being inserted beyond a desired location within the egg. Exemplary membranes within an egg include, but are not limited to, the outer shell membrane, inner shell membrane, the chorioallantoic membrane, vitelline (VM) membrane, and amniotic membrane (amnion).

Referring now to FIG. 1A, an injection apparatus 10 for injecting and/or removing a substance from subjects, such as avian eggs, according to embodiments of the present invention, is illustrated. The illustrated injection apparatus 10 includes an injection needle 12 having a body portion 14 and a tapered portion 12a that terminates at tip 12b. Tip 12b may be blunt or may have an aperture therein in communication with the needle lumen (not illustrated). Needles and lumens within needles are well understood by those skilled in the art of the present invention. If tip 12b is blunt, an aperture is formed in the side of the needle adjacent the tip and is in communication with the needle lumen.

A tube 16 is attached to and extends around the injection needle 12 in substantially concentric relationship therewith. The tube 16 has an end portion 16a positioned a predetermined distance from the needle tip 12b. The tube end portion 16a acts as a stop to limit the distance the needle tip 12b can be inserted through a membrane or other tissue of a subject, such as an egg.

The tube 16 does not have to extend completely around the needle 12. Tube 16 may only partially surround the needle 12, according to embodiments of the present invention.

FIG. 1B illustrates an injection apparatus 10' for injecting and/or removing substances from subjects, such as avian eggs, according to other embodiments of the present invention. In FIG. 1B, the injection needle 12' is a "pulled pipette" needle having a very slender body portion 14', as illustrated.

The injection needles 12, 12' illustrated in FIGS. 1A-1B may be attached to a tube 16 in various ways as would be understood by those skilled in the art. For example, a needle and surrounding tube may be adhesively attached to each other or may be fused together via any of various known methods. Embodiments of the present invention are not limited to any particular method of attaching injection needles 12,12' and tube 16.

The injection needles 12, 12' illustrated in FIGS. 1A-1B may be formed from various materials including, but not limited to, glass, metals, and polymeric materials. Exemplary injection needles are available from Humagen, Inc. Moreover, injection needles having various shapes, sizes and configurations may be utilized in accordance with embodiments of the present invention. Needles may also have blunt tips and one or more apertures formed in the side thereof for injecting material into an egg or sampling material from an egg. Embodiments of the present invention are not limited to the illustrated injection needles 12, 12'. The tube 16 surrounding the injection needles 12, 12' may also be formed from various materials including, but not limited to, glass and metal.

In the illustrated embodiments of FIGS. 1A-1B, an annular space 20 is defined between the injection needle 12, 12' and the tube 16. A sealant material 22 is disposed within the annular space 20 to prevent the flow of material through the annular space 20, as illustrated in FIG. 2. Various types of sealant materials known to those skilled in the art may be utilized, without limitation. According to embodiments of the present invention, the tube 16 and needle 12, 12' may be fused together such that no annular space exists.

According to an embodiment of the present invention, the injection needles 12, 12' are disposed within a capillary tube 16 having an outside diameter of about 1.98 mm and an inside diameter of about 1.2 mm. However, according to other embodiments of the present invention, tube 16 may have various diameters, lengths, and other dimensions, without limitation.

FIG. 3 illustrates the injection apparatus 10 of FIG. 1 A with the tip 12b of the injection needle 12 extended to a predetermined depth within an egg 1 as a result of the tube 16 acting as a stop and making contact with a membrane 2 within the egg 1. The membrane 2 may be any of a number of membranes located internally within an egg. The needle tip 12b may be positioned in any of various locations within an egg. The illustrated location 3 in FIG. 3 is a blastoderm.

According to other embodiments of the present invention, a disk of material 30 may surround an injection needle 12 at a predetermined distance from the injection needle tip 12b and serve the function of a stop, as illustrated in FIGS. 4A-4B. As illustrated in FIG. 4B, the insertion of the needle 12 into an egg stops (e.g., the downward movement of the needle is halted) when the disk of material 30 contacts a membrane 2. The disk of material 30 may be formed from various materials and may have virtually any shape and configuration. Moreover, a disk of material may be located virtually anywhere on a needle 12. An exemplary disk of material may be a bead of adhesive material applied to the injection needle 12 (e.g., circumferentially or partially circumferentially).

According to other embodiments of the present invention, a force detector 40 may be utilized to measure the force exerted on a membrane of an egg by a stop, by a needle, and/or by a needle and a stop, as illustrated in FIG. 5. In the illustrated embodiment, the force detector 40 is a weigh scale positioned beneath an egg 1. When a stop (e.g., tube 16) makes contact with a membrane 2 within an egg 1, the downward force is measured on the weigh scale 50. An exemplary weigh scale is available from Ohaus Corporation (Pine Brook, N.J.). In addition, the force required for the needle 12 to penetrate the membrane 2 can be measured by force detector 40. The measurement of this force may allow an operator to detect a position of a needle, or other device, being inserted within an egg.

Alternatively, a load cell may be utilized as a force detector 40. As would be understood by those skilled in the art, an amplification and/or filtering circuit may be utilized in conjunction with a load cell to boost the output and remove any unwanted noise. An analog/digital converter (e.g., a USB LabJack U12 from LabJack Corporation, Lakewood, Colo.) could be utilized to acquire force signals at some rate and a software program (e.g., LabView 7.0 from National Instruments Corporation, Austin, Tex.), could be used to graph the force signals with respect to time.

The use of a weigh scale/load cell can also be utilized to detect the presence of an egg in an egg flat. For example, if a needle is lowered but no force is recorded/detected, it will be known that no egg is present. Thus, injection of a substance is not performed via the needle.

Figure 6B:
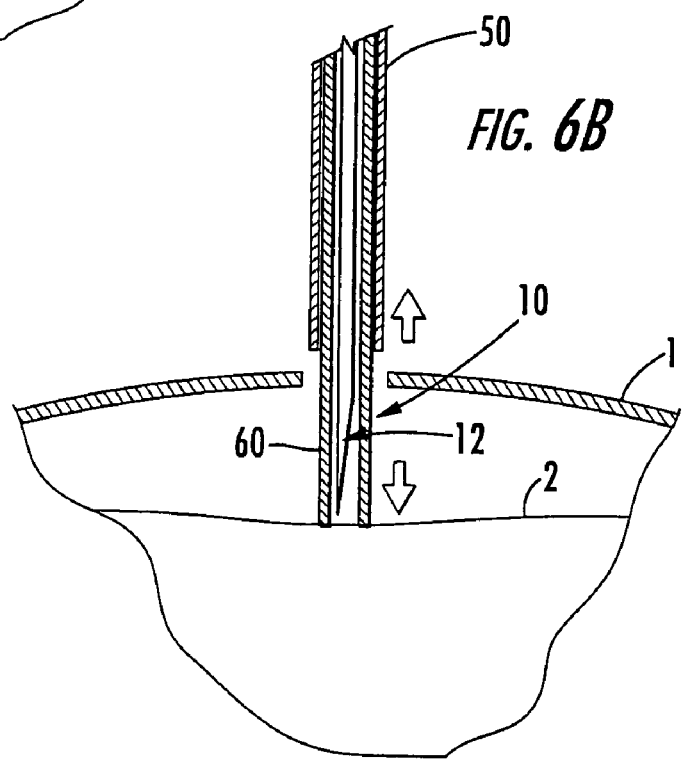

Referring to FIGS. 6A-6B, an apparatus according to embodiments of the present invention may include a tubular punch 50 that is configured to form an opening in the shell of an egg 1. In the illustrated embodiment, a tubular locating member 60 is reciprocally disposed within punch 50 and a needle 12 is reciprocally disposed within the locating member 60. In FIG. 6A, the punch forms an opening in the shell of an egg 1. In FIG. 6B, the punch is retracted from the egg 1 and the locating member 60, which is reciprocally movable within the punch 50, moves down into the egg 1 until locating member 60 contacts a membrane 2. When contact is made, the locating member 60 stops its downwardly movement into the egg. In FIG. 6C, the locating member 60 has been locked into place and the needle 12 is extended a predetermined distance past the locating member 60 into the egg. The locating member 60 can be locked in place via any of a various number of ways. Exemplary injection needle-punch configurations, which may be utilized in conjunction with embodiments of the present invention, are described in U.S. Pat. Nos. 4,903,635; 5,136,979; and RE 35,973.

Figure 7:
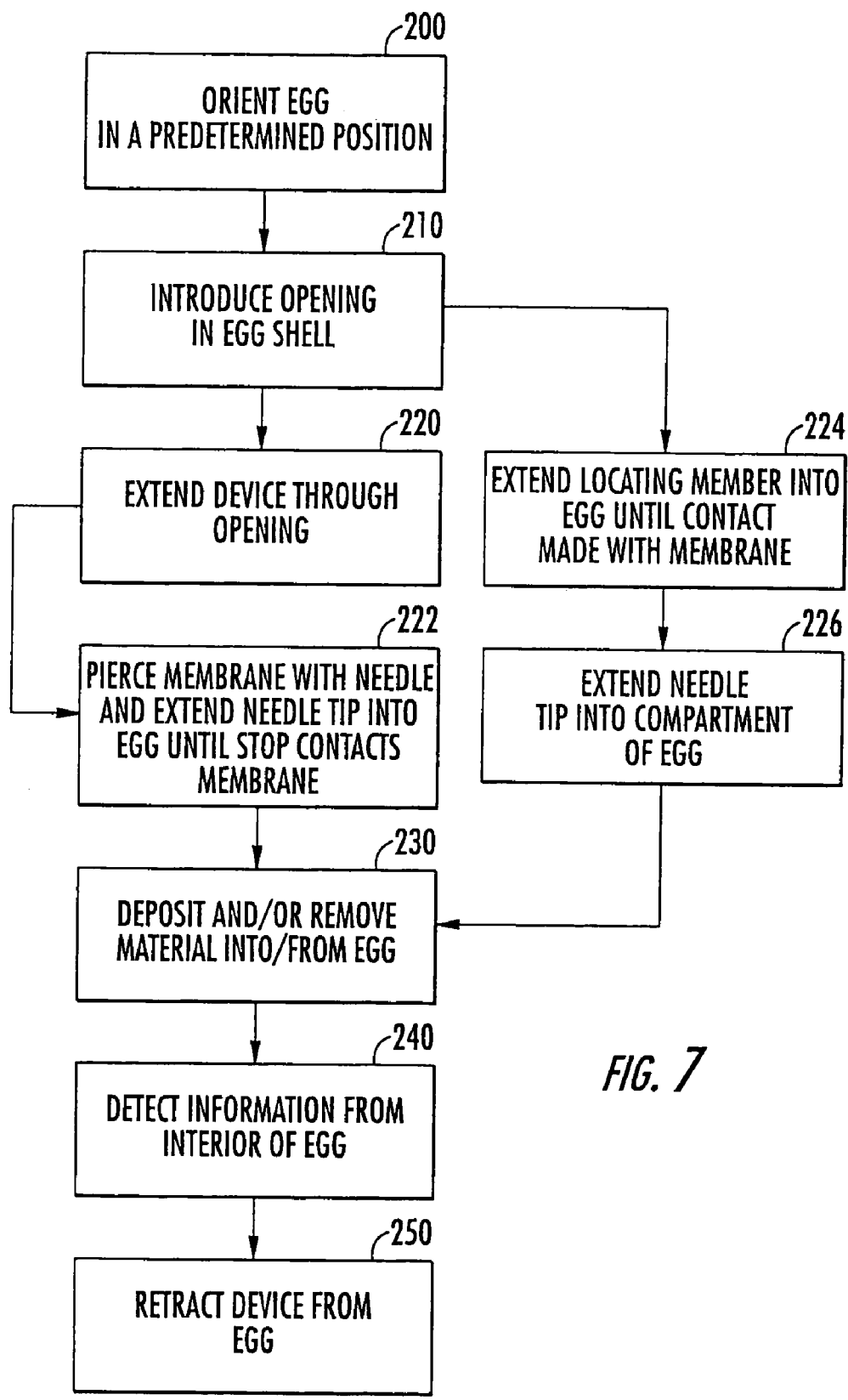
FIG. 7 is a flow chart that illustrates particular embodiments of the present invention.

FIG. 7 is a flow chart that illustrates particular embodiments of the present invention. Referring initially to Block 200, an avian egg is oriented in a predetermined position (e.g., with the blunt end of the egg in a generally upward position, or with the egg positioned sideways, etc.). The egg may be oriented in virtually any position. For example, the egg may be oriented in a horizontal or vertical position (with respect to the long axis) or at an angle therefrom during the storage period. In particular embodiments, the egg may be stored in the same orientation as used for injection/sampling. Further, the egg may be held in a fixed position (e.g., within a device) in which both side-to-side movement and rotation around the long axis of the egg are restricted or prevented.

An opening is introduced into the shell of the egg (Block 210) via a punch or other device known to those skilled in the art. According to embodiments of the present invention, the surface of an egg, at least around the site of injection, may be sanitized to reduce microbial (or other) contamination (e.g., with an alcohol or other sanitizing solution). However, sanitizing an egg, including the site of injection, is not required with respect to embodiments of the present invention.

A device is extended through the opening in the egg shell (Block 220). A membrane (or other tissue) within the egg is pierced by an injection needle and the needle is extended into the egg until a stop attached to the needle contacts the membrane which halts the downward movement of the needle into the egg (Block 222). Material is deposited and/or removed from the egg via the injection needle (Block 230). Information may also be detected from the interior of the egg via a sensor (Block 240). The device is then retracted from the egg (Block 250).

Alternatively, a locating member is extended through the opening in the egg shell until it contacts a membrane within the egg which stops the downward movement of the location member (Block 224). The locating member is then locked in position. A needle, sampling device and/or sensor is then extended by a predetermined amount past the locating member to accurately position the needle, sampling device and/or sensor at a desired location. Material is deposited and/or removed from the egg (Block 230). Information may also be detected from the interior of the egg via a sensor (Block 240). The device (locating member and needle) is then retracted from the egg (Block 250).

The methods described herein may be fully manual, fully automated, or semi-automated. For example, the steps of egg preparation and positioning the embryo may be more suited for manual procedures. The steps of introducing an opening in an egg shell and inserting an injection apparatus, may be manual, but are preferably automated.

In some embodiments, a multi-site injection or sampling device may be used, for example, as described in U.S. Pat. No. 6,032,612. Other exemplary delivery and/or sampling devices include those described in U.S. Pat. Nos. 5,136,979; 4,681,063 and 4,903,635; and U.S Pat. Nos. 4,040,388, 4,469,047, and 4,593,646.

In a further embodiment, an injection apparatus further comprising a detector as described in U.S. Pat. No. 6,244,214 is used to collect information regarding the position of an embryo (e.g., blastoderm) or other portion or compartment of an egg prior to or concurrently with injection into the egg (for the purposes of sampling and/or delivering a substance into the egg or embryo).

Those skilled in the art will appreciate that methods of the present invention may be carried out on a plurality of eggs, e.g., in a commercial poultry operation.

Figure 8A:
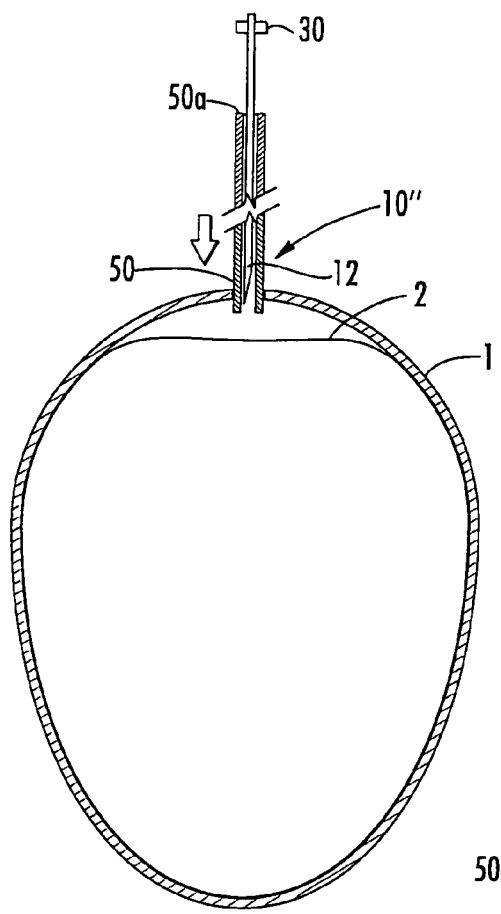
FIGS. 8A-8B are side, cross-sectional views of an injection apparatus having an injection needle with a stop, wherein the needle is surrounded by a tubular punch that is configured to form an opening in the shell of an egg, wherein the punch is forming an opening in the egg shell in FIG. 8A and wherein the injection needle is inserted within the egg in FIG. 8B.
Figure 8B:
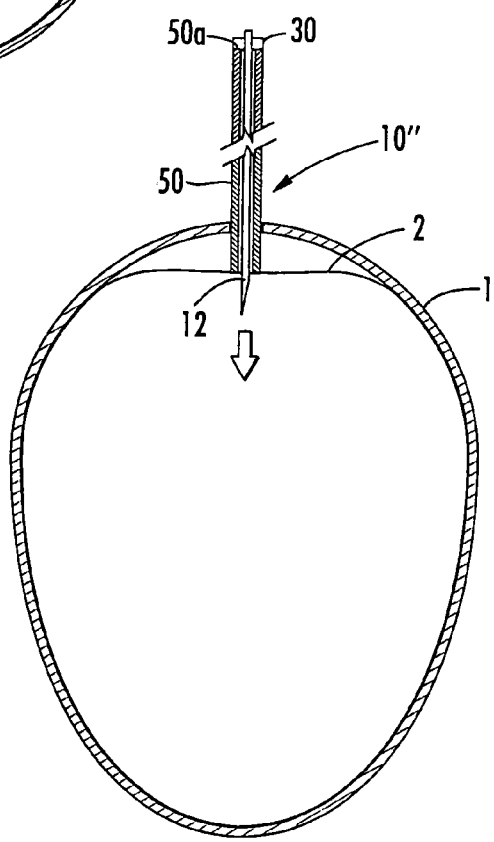

Referring to FIGS. 8A-8B, an injection apparatus 10" according to embodiments of the present invention includes a tubular punch 50 configured to form an opening in the shell of an egg 1. An injection needle (or sampling device, detector, etc.) 12 is positioned within the punch 50 and is configured for reciprocal movement therethrough and through an opening in an egg shell formed by the punch 50. A stop 30 is attached to the needle 12 and is configured to contact the upper end 50a of the punch 50 when the needle 12 moves through the punch 50 into an egg 1 so as to limit the distance the needle is inserted within the egg 1. In FIG. 8A, the punch 50 forms an opening in the shell of an egg 1. In FIG. 8B, the punch 50 also serves as a locating member and extends down until contact is made with a membrane 2 whereupon downward movement of the punch is stopped. The punch may then be locked into place. The needle 12 moves down into the egg 1 until the stop 30 contacts the upper end 50a of the punch 50. Thus, the needle 12 is extended a predetermined distance into the egg after contact is made with the membrane 2 by the punch/locating member.

In an exemplary embodiment, the present invention may be used to accurately and repetitively deliver a substance to an egg containing an early embryo (e.g., a blastoderm) or to deliver a substance to the early embryo itself, for example to the subgerminal cavity. Any substance may be injected by embodiments of the present invention, including but not limited to cells, transgenic cells, vaccines, polypeptides, growth-promoting agents, probiotic cultures such as competitive exclusion media, antibiotics, heterologous nucleotide sequences including gene transfer vectors, vitamins, and/or markers such. as dyes, etc. The substances may be injected alone, or in combination (e.g., antibiotics may be included with the delivery of other substances). As another illustrative example, a dye or other marker may be included with other substances to be delivered to provide a means of determining whether delivery was to the desired location.

The present invention may also be advantageously used to introduce a nucleotide sequence of interest into a developing embryo (preferably, the nucleotide sequence is stably transformed into the embryonic cells), i.e., to create a transgenic bird (as defined above). In other embodiments, the present invention may be used to introduce a foreign or "donor" cell into a recipient embryo (i.e., to create a chimeric embryo and, optionally, a chimeric bird, as defined above).

Figure 9:
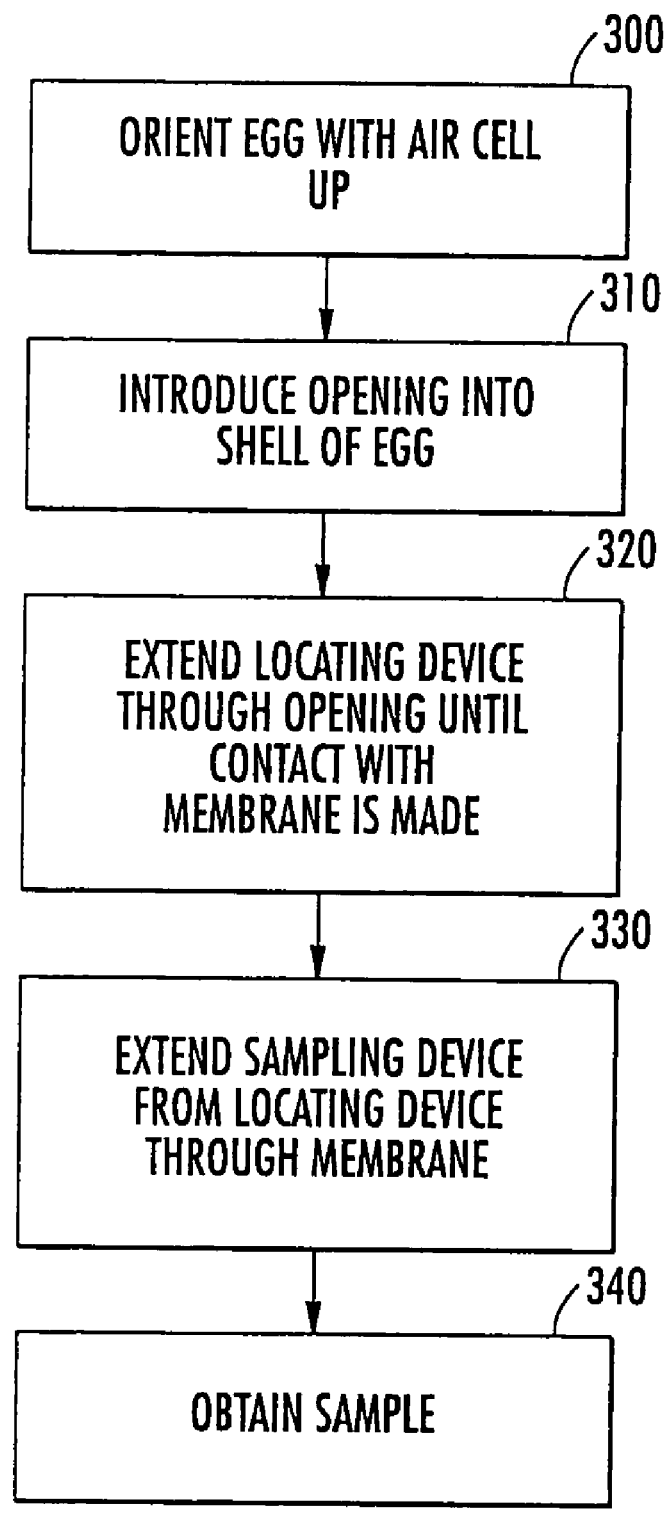
FIG. 9 is a flow chart that illustrates particular embodiments of the present invention.

Referring to FIG. 9, a method of sampling material (e.g., allantoic fluid, etc.) from an egg, according to embodiments of the present invention, is illustrated. An egg is oriented with the air cell up (Block 300) and an opening is introduced into the shell thereof (Block 310). Egg manipulation and the formation of openings in the shell of an egg are well known to those skilled in the art, and can be accomplished in various ways according to embodiments of the present invention.

A locating device is extended through the opening in the egg shell until contact with a membrane (e.g., the chorio-allantoic membrane (CAM)) is made (Block 320). Movement of the locating device is halted and then preferably locked in place via any of various known methods. The locating device may be housed within a punch that is utilized to form an opening within the egg shell. However, embodiments of the present invention are not limited to such a configuration. The locating device may have virtually any shape and configuration as long as it is configured to make contact with a membrane, such as the CAM, and to allow a sampling/injection/detection device to be extended therefrom.

Contact with the membrane is detected via force exerted on the membrane. As described above with respect to FIG. 5, a force detector may be utilized to measure the force exerted on the membrane by the locating device. The force exerted on the membrane may be measured by a scale, load cell or any other force or pressure sensing device. Force from contact on the membrane should not exceed about 30 grams as the membrane may be ruptured with a force greater than about 30 grams.

According to embodiments of the present invention, a sampling device is extended from the locked locating device through the membrane by a predetermined amount (Block 330) and a sample of allantoic fluid is obtained via the sampling device (Block 340). The sampling device may be a needle configured to draw allantoic fluid from the egg, as would be understood by those skilled in the art. For example, the needle may have a blunt tip and an axially-extending lumen that terminates at an aperture formed within a portion of the needle adjacent the tip. Allantoic (or other) fluid can be drawn into the lumen via the aperture upon subjecting the lumen to vacuum. The blunt tip prevents the lumen from becoming clogged with material.

The distance that the sampling device is extended is typically between about three millimeters and about five millimeters; however, other distances and ranges of distances are possible. According to embodiments of the present invention, the sampling device may include a stop, as described above, that limits the distance the sampling device can be inserted through the membrane. According to other embodiments of the present invention, an injection device or a detection device may be extended from the locked locating device into the egg.

Embodiments of the present invention are advantageous for obtaining any type of fluid from avian eggs including, but not limited to, blood, amniotic fluid, and allantoic fluid.

Embodiments of the present invention are especially advantageous for obtaining allantoic fluid from avian eggs. With variations in flock, flock age, storage time and other factors, the location and integrity of the CAM can be extremely variable. Accordingly, obtaining a sample of allantoic fluid via conventional methods wherein needles travel a set depth will often result in poor and/or variable sampling accuracy. Embodiments of the present invention positively locate the CAM thus ensuring accurate location of a sample needle within allantoic fluid, as well as within other types of fluid, such as blood or amniotic fluid, etc.

Referring now to FIGS. 10A-10F, an apparatus 100 for sampling and/or injecting material from/into an avian egg, according to embodiments of the present invention, is illustrated. The illustrated apparatus 100 includes a tubular punch 50 that is configured to form an opening in the shell of an egg 1. In the illustrated embodiment, a tubular locating member 60 is reciprocally disposed within punch 50 and a needle 12 is reciprocally disposed within the locating member 60. A locking device 102 is secured to the punch 50 and is configured to lock the locating member 60 in place relative to a membrane 2 of the egg 1. The illustrated locking device 102 is a compressible flange that has a tapered end portion 102a that is configured to matingly engage with tapered end portion 104a of a housing 104 of the apparatus 100. When the flange 102 and housing 104 are matingly engaged, the flange compresses around the locating member 60 and prevents movement of the locating member 60 relative to the punch 50. Embodiments of the present invention are not limited to the illustrated flange 102 for locking the locating member 60. Various types of devices may be utilized for locking the locating member 60 without limitation.

Figure 10A:
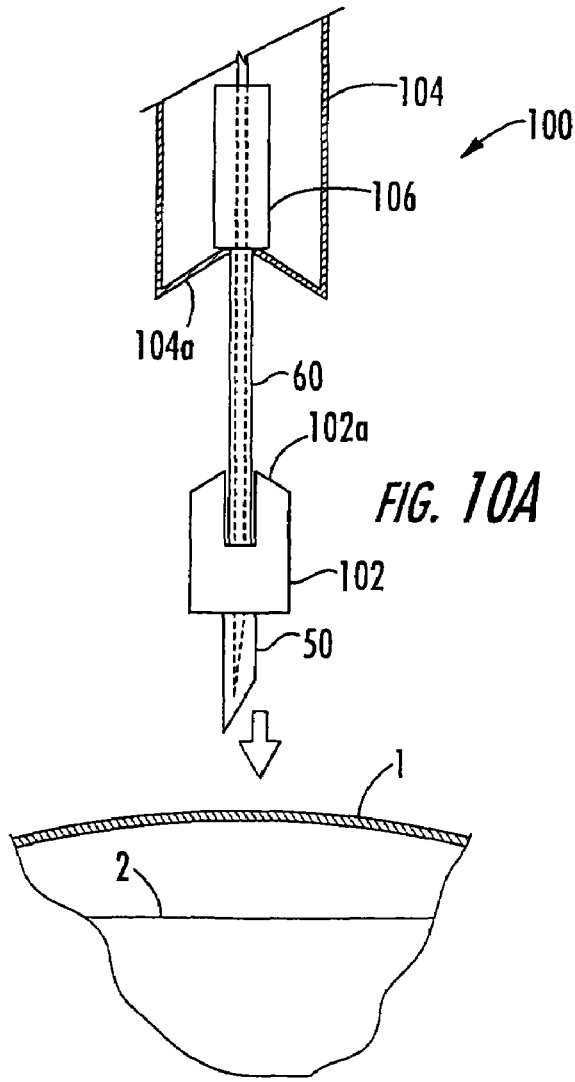
Figure 10B:
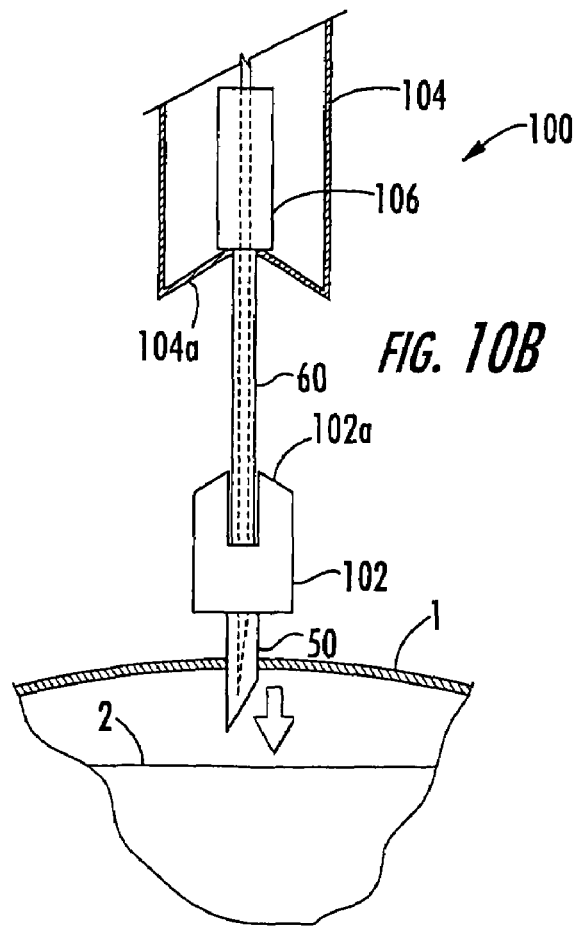

In FIG. 10A, the apparatus 100 is moving downwardly such that the punch 50 forms an opening (FIG. 10B) in the shell of an egg 1. In FIG. 10C, the locating member 60, which is reciprocally movable within the punch 50, moves down into the egg 1 until locating member 60 contacts a membrane 2. When contact is made, the locating member 60 stops its downwardly movement into the egg and is "free floating" on top of the membrane 2. The term "free floating" means that the locating member 60 is resting on the membrane 2 and no other loads are being applied to the locating member 60.

Figure 10E:
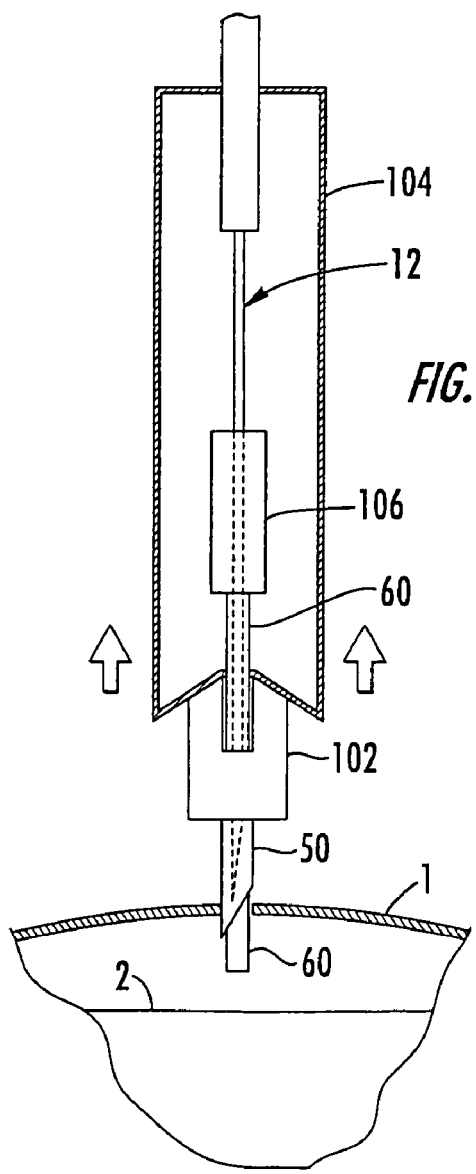
Figure 10F:
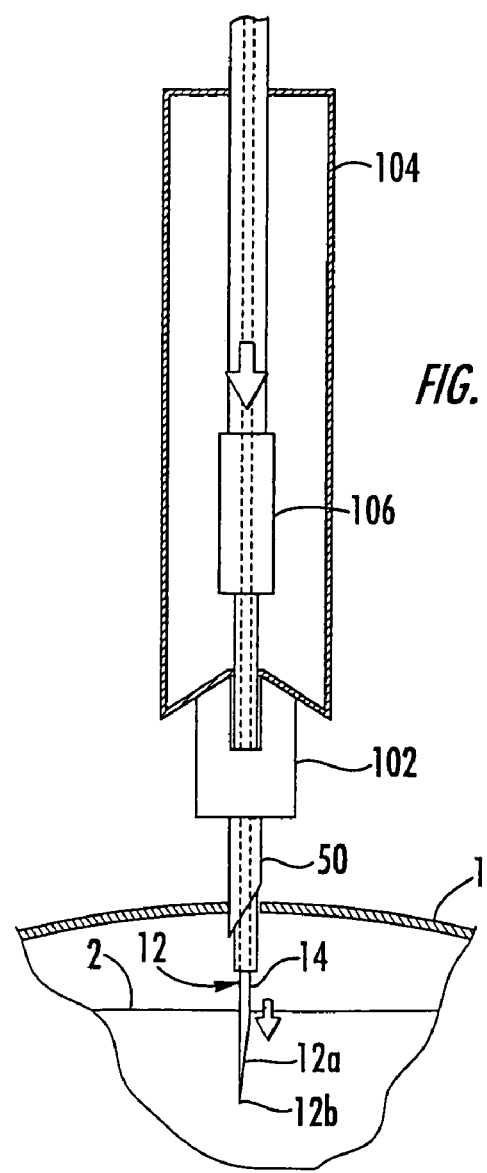

Still referring to FIG. 10C, the housing 104 also moves downwardly and engages with the flange 102 (FIG. 10D) to lock the locating member 60 relative to the punch 50. The housing 104 is then moved upwardly as illustrated in FIG. 10E with the flange 102 engaged therewith. As such, the flange 102, punch 50 and locating member 60 are moved upwardly as a unit. When the housing has been raised a predetermined amount, as illustrated in FIG. 10F, the locating member 60 is no longer in contacting relationship with the membrane 2. The needle 12 is then extended a predetermined distance past the locating member 60 into the egg. In the illustrated embodiment, a stop 106 is attached to the locating member 60. The needle 12 also includes a stop 108 associated therewith. When the needle 12 is moved downwardly into the egg, the needle stop 108 engages the locating member stop 106 which stops the downward movement of the needle 12 The stops 106, 108 are configured to allow the needle 12 to be inserted a predetermined amount into an egg.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of processing an egg, comprising:
   introducing an opening into a shell of the egg;
   extending a locating device through the opening in the egg shell until contact with a membrane is detected;
   locking the locating device in relationship with the membrane; and
   extending a device through the membrane by a predetermined amount relative to the locked locating device.

2. The method of claim 1, wherein detecting contact with the membrane comprises detecting a force exerted on the membrane by the locating device.

3. The method of claim 1, wherein locking the locating device in relationship with the membrane comprises locking the locating device in contacting relationship with the membrane.

4. The method of claim 1, wherein the device is a sampling device, and further comprising sampling material from the egg via the sampling device.

5. The method of claim 4, wherein the material comprises allantoic fluid.

6. The method of claim 4, wherein the material comprises amniotic fluid.

7. The method of claim 4, wherein the material comprises blood.

8. The method of claim 4, wherein extending the sampling device through the membrane comprises extending the sampling device between about two millimeters and about six millimeters.

9. The method of claim 4, wherein the sampling device comprises a needle having a blunt tip and an axially-extending lumen that terminates at an aperture formed within a portion of the needle adjacent the tip, and wherein material is drawn into the lumen via the aperture upon subjecting the lumen to vacuum.

10. The method of claim 4, wherein the sampling device comprises a stop that limits the distance the sampling device can be inserted through the membrane.

11. The method of claim 1, wherein the device is an injection device, and further comprising injecting a substance into the egg via the injection device.

12. The method of claim 1, further comprising orienting the avian egg with the air cell up, and wherein introducing an opening into a shell of the egg comprises introducing an opening into the shell at a location above the air cell.

13. The method of claim 1, wherein the membrane is the chorio-allantoic membrane.

14. The method of claim 1, wherein the device is a detector device and further comprising detecting information from the interior of the egg with the detector device.

15. The method of claim 1, wherein the egg contains a blastoderm, and wherein the device is extended through the opening in the egg shell to a location in the blastoderm.

16. An apparatus, comprising:
   a tubular punch configured to form an opening in the shell of an egg;
   a tubular locating device positioned within the punch for reciprocal movement therethrough and through an opening in an egg shell formed by the punch, wherein the locating device is configured to contact a membrane within an egg;
   a locking device configured to lock the locating device in relationship with the membrane; and
   a needle positioned within the locating member for reciprocal movement therethrough, wherein the needle comprises a tip configured to be inserted through a membrane within an egg by a predetermined amount relative to the locked locating device.

17. The apparatus of claim 16, wherein the locking device is configured to lock the locating device in contacting relationship with the membrane.

18. The apparatus of claim 16, wherein the locking device is attached to the punch.

19. The apparatus of claim 16, wherein the needle is configured to remove a sample from the egg.

20. The apparatus of claim 16, wherein the needle is configured to inject a substance into the egg.

* * * * *